United States Patent
Cho

(10) Patent No.: US 7,986,238 B2
(45) Date of Patent: Jul. 26, 2011

(54) TRACKING LOCATION AND REALTIME MANAGEMENT SYSTEM OF A CONTAINER USING RF

(75) Inventor: Joong-Sam Cho, Seoul (KR)

(73) Assignee: E-PIA Co., Ltd., Seoul (KR)

( * ) Notice: Subject to any disclaimer, the term of this patent is extended or adjusted under 35 U.S.C. 154(b) by 387 days.

(21) Appl. No.: 12/299,026

(22) PCT Filed: Nov. 17, 2006

(86) PCT No.: PCT/KR2006/004861
§ 371 (c)(1),
(2), (4) Date: Oct. 30, 2008

(87) PCT Pub. No.: WO2007/126193
PCT Pub. Date: Nov. 8, 2007

(65) Prior Publication Data
US 2009/0146815 A1 Jun. 11, 2009

(30) Foreign Application Priority Data
May 2, 2006 (KR) .................. 10-2006-0039642

(51) Int. Cl.
*G08B 13/14* (2006.01)
(52) U.S. Cl. ............... 340/572.1; 340/539.1; 340/568.1; 340/870.16

(58) Field of Classification Search .... 340/572.1–572.9, 340/539.1, 568.1, 571, 539.22, 5.92, 870.16, 340/539.26, 506, 5.8
See application file for complete search history.

(56) References Cited

U.S. PATENT DOCUMENTS

| | | | |
|---|---|---|---|
| 7,012,529 B2 * | 3/2006 | Sajkowsky ................. | 340/572.1 |
| 7,082,344 B2 * | 7/2006 | Ghaffari ..................... | 700/115 |
| 7,158,028 B1 * | 1/2007 | Ghahramani ............ | 340/539.22 |
| 7,471,203 B2 * | 12/2008 | Worthy et al. ............. | 340/572.1 |
| 2005/0248454 A1 * | 11/2005 | Hanson et al. ........... | 340/539.26 |
| 2006/0200560 A1 * | 9/2006 | Waugh et al. ................. | 709/224 |

FOREIGN PATENT DOCUMENTS

| | | |
|---|---|---|
| KR | 10-2002-0015202 A | 2/2002 |
| KR | 10-2005-0046841 A | 5/2005 |
| KR | 10-2005-0067392 A | 7/2005 |
| KR | 10-2005-0070729 A | 7/2005 |
| KR | 10-0542452 B1 | 1/2006 |

* cited by examiner

*Primary Examiner* — Daniel Previl
(74) *Attorney, Agent, or Firm* — Hershkovitz & Associates, LLC; Abe Hershkovitz

(57) ABSTRACT

Disclosed is a system for managing containers through RF communication and to a container position tracking and real-time management system employing RF, in which safety information and management information of a container are obtained by a sensor and a wireless terminal device attached to a container, the position of the container is tracked until it reaches its destination through a reader through RF communication, environments within the container are monitored in real-time for safe transportation, and security and crime prevention functions are carried out.

7 Claims, 6 Drawing Sheets

TRACKING LOCATION AND REALTIME MANAGEMENT SYSTEM OF A CONTAINER USING RF

This is a national stage application under 35 U.S.C. §371 of PCT/KR2006/004861 filed on Nov. 17, 2006, which claims priority from Korean patent application 10-2006-0039642 filed on May 2, 2006, all of which are incorporated herein by reference.

TECHNICAL FIELD

The present invention relates to a system for generating, tracking and managing information of freight by employing Radio Frequency (RF) communication, and more particularly, to a container position tracking and real-time management system employing RF, in which security monitoring information and management information of a container, which are obtained by a sensor and tag attached to a container freight, are transmitted along with position information of the container, generated from a reader, and the position of the container is tracked until it reaches its destination through RF communication, thus enabling various functions such as safe transportation of containers, real-time monitoring of environments within the containers, and security and crime prevention.

BACKGROUND ART

The present system employs a Ubiquitous Sensor Network (USN) technique, which is operated by using a reader (reader for vehicles, freight trains, freight ships and so on) having a reception function of wirelessly exchanging information with a wireless terminal device having unique information and a management processor embedded therein in a state where various sensors related to security and crime prevention are connected thereto, a GPS function of generating position information, a module function (such as for CDMA, GSM and satellite communication) of gaining access to a commercial communication network and performing communication, and so on.

The USN is a network system configured to wirelessly collect information sensed by various sensors. The USN technique is a high-level technique as compared with a technique of perceiving the flow of various pieces of physical distribution information by attaching tags to things based on a Radio Frequency Identification (RFID) technique in order to perceive the flow of physical distribution. RFID includes a tag having unique information embedded therein, a reader, a network and so on, and is used to process information by identifying a thin plane tag attached to a thing based on magnetic or electrical fields without physical contact. Thus, RFID is advantageous in that there is no damage, which may occur due to friction caused by contact, there is a low possibility of contamination, and recognition is possible even in a moving object moving at high speed. Accordingly, in recent years, there has been a rapid increase of the need for a systematic physical distribution management system for enhancing physical distribution competitiveness. Thus, there has been provided a physical distribution management system based on a wireless network technology in which such RFID is applied to position tracking of physical distribution in conjunction with RF communications such as GPS.

Techniques employing both such RFID and the wireless network include Korean Patent Application Nos. 10-2003-0055064 and 10-2003-0079001. In these prior arts, a RFID tag including article information is attached to an article and the position of the article is recognized when a specific frequency is sensed, or a product code detected from a RFID tag is transmitted via a wireless network.

However, the prior arts are not suitable for the safety or management of a physical distribution system of containers that move a long distance because a position is simply tracked or information is transmitted based on the RFID tag.

In particular, the amount of physical distribution mounted in containers for export is huge and necessary environments, such as temperature and humidity, are of various kinds depending on the types of articles. Thus, there is an urgent need for the development of a system, which can maintain specific internal environments set according to long-distance transportation for a predetermined time and immediately cope with any problems.

Further, in the case of physical distribution exported to the U.S., etc., for security management of containers in view of safety, regulations are becoming under tighter control, such as that it is obliged to use eSeal of a type in which a mechanical seal is combined with the conventional RFID. However, it is difficult to prepare solutions to forgery, replication, etc. and it is therefore necessary to enhance safety and management functions.

DISCLOSURE OF INVENTION

Technical Problem

Accordingly, the present invention has been made to solve the above problems occurring in the prior art, and an object of the present invention is to provide a large-scale physical distribution (also called "logistics") system, including a container tag with information collection and security functions of environments within a container for logistics and transportation and a reader that performs RF communication in a vehicle or ship for transporting the container or a harbor in which the container is placed.

Another object of the present invention is to provide a USN system, which can track the position of a container until the container reaches its destination and immediately cope with any problems occurring by monitoring, in real-time, a change of environments within a container that needs to be transported safely.

Still another object of the present invention is to provide a container tag, which can perform not only the functions of the conventional RFID, but also functions such as crime prevention and security, so that the inside of a container can be prevented from being opened through external manipulation or illegal articles can be prevented from being loaded in the container.

Technical Solution

To achieve the above objects, a container position tracking and real-time management system for tracking the location of a container in association with a wired/RF communication network, the system including a container tag including a sensor unit that monitors measurement information about environment within a container and whether the container is abnormal, and a communication unit that transmits container management information, including the monitoring results of the sensor unit and a container-specific address, to a reader through RF communication; and a reader installed at a vehicle or ship that transports the container and including a RF receiver module that receives the container management information from the container tag.

The communication unit sends the collected container management information at predetermined time intervals, and immediately sends results of events, such as error of eSeal, an occurrence of abnormality such as a temperature, humidity and pressure, and a possible danger of discharge of a battery. When communication transmission fails, the communication unit accumulates and stores contents that have not been sent in a memory unit and then sends the contents in the first place when communication resumes.

The reader is equipped with a GPS module for analyzing position information of the vehicle or ship with which the container is loaded.

The reader is equipped with one of a CDMA module and a satellite communication module, and sends the received container management information to a management server through RF communication.

The management server includes one of the CDMA module and a module for wired telephone, for receiving the container management information from the reader.

The management server includes a plurality of local servers disposed at a harbor in which containers are placed, and a main server that integrally manages information of each reader and each local server.

The local server is equipped with a RF receiver module that receives container management information from a container tag of a container that is being loaded.

The management server includes a controller for monitoring and recording an operating status of the reader and generating an event when a communication fails for a predetermined time, a database unit for storing each collected container management information and the monitoring results of the controller, and a display unit for outputting stored container management information, an operating status and results of an event through voice or a screen.

The container management information stored in the database unit includes normal state information reported predetermined time intervals from the reader, and abnormal state information reported in the first place. The abnormal state information is sent to the management server as soon as the abnormal state information is generated and then output through the display unit. The respective management servers are connected through the Internet and share stored normal state information and abnormal state information.

ADVANTAGEOUS EFFECTS

In accordance with the present invention, a container tag having an information collection function of internal environments is attached to a container for logistics and transportation, and a reader equipped with a GPS module is installed at a vehicle or ship for transporting the container or a harbor in which the container is placed. Accordingly, there is an advantage in that the position of container physical distribution can be tracked until it reaches its destination.

Further, according to the present invention, when abnormality occurs in each container tag, this fact is instantly sent to a reader or a management server, an alarm is generated through voice or a screen, and necessary measures are taken immediately. Accordingly, there is an advantage in that physical distribution can be managed in real-time.

Further, the container tag of the present invention can perform not only the functions of the conventional RFID, but also functions such as crime prevention and security. Accordingly, there is an advantage in that the inside of a container can be prevented from being opened through external manipulation or illegal articles can be prevented from being loaded in the container.

Further, the container tag of the present invention can determine whether a temperature or humidity within a container exceeds a specific level or an abrupt change of a temperature or humidity within a container. Accordingly, there are advantages in that freight mounted in a container can be protected and the spread of an accident upon occurrence of a fire, etc. can be prevented.

Further, according to the present invention, container management information is distributed and stored but can be shared between management servers. Accordingly, there are advantages in that overload depending on concentration of information can be prevented and a danger of information loss can be reduced.

BRIEF DESCRIPTION OF THE DRAWINGS

Further objects and advantages of the invention can be more fully understood from the following detailed description taken in conjunction with the accompanying drawings in which.

Figure 1:
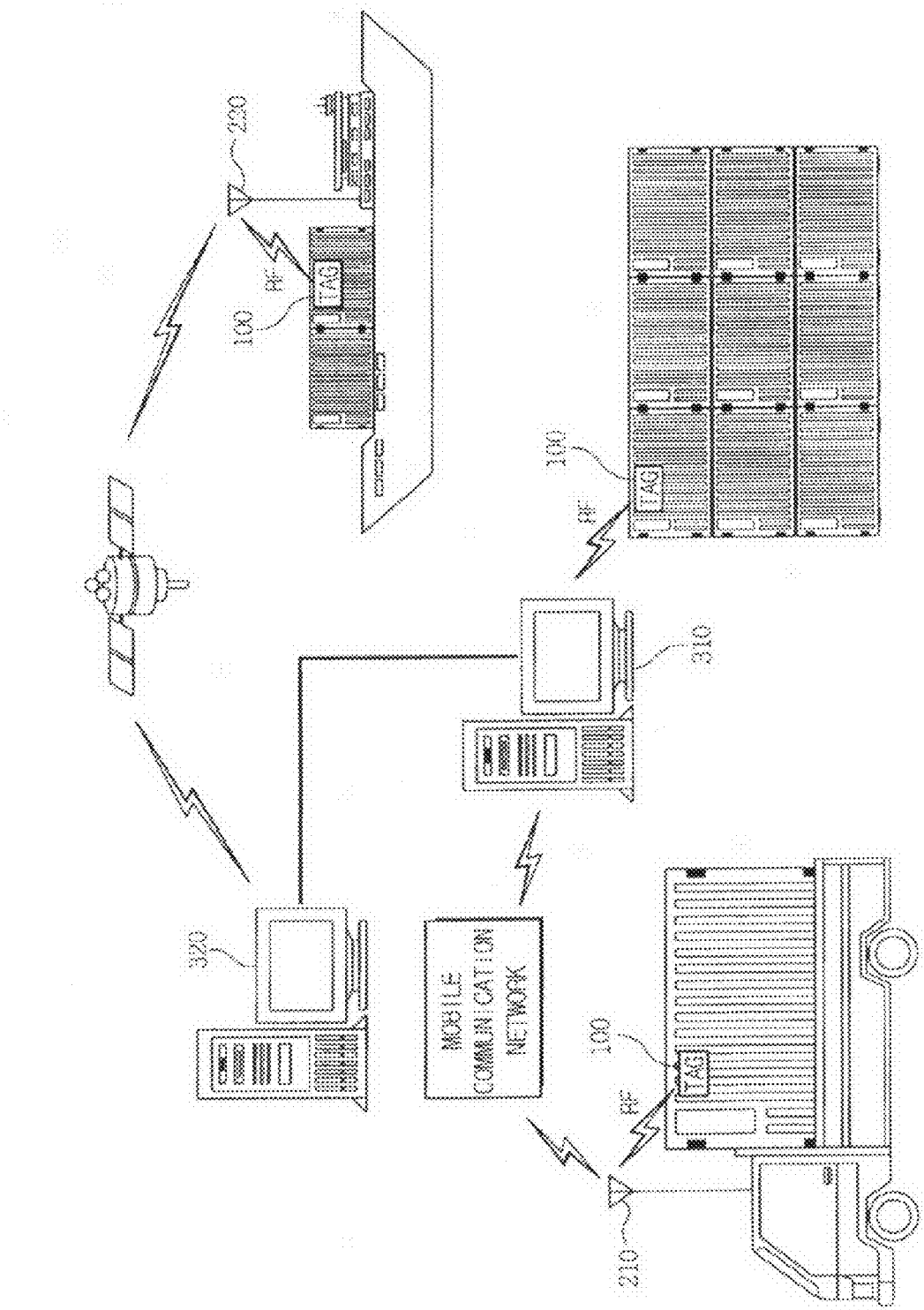
FIG. 1 is a view illustrating the configuration of a container position tracking and real-time management system employing RF according to the present invention.

| <DESCRIPTION ON REFERENCE NUMERALS> | |
|---|---|
| 100: container tag | 200: reader |
| 210: vehicle reader | 220: ship reader |
| 300: management server | 310: local server |
| 320: main server | |

BEST MODE FOR CARRYING OUT THE INVENTION

The present invention will now be described in detail in connection with specific embodiments with reference to the accompanying drawings.

FIG. 1 is a view illustrating the configuration of a container position tracking and real-time management system employing RF according to the present invention.

As shown in FIG. 1, the container position tracking and real-time management system according to the present invention includes a container tag (a wireless terminal device) 100 attached to a container, which is placed at a harbor or transported by a vehicle, ship and so on, and configured to collect and transmit container management information of a corresponding container; a reader (a reader) 200 installed at a vehicle, ship or the like, for transporting a container and configured to transmit the container management information, received from the container tag (the wireless terminal device), and current position information to a local server or a main server through RF communication; and a management server 300 that receives the information from the reader through RF communication, stores collected container management information, and outputs the stored container management information, an operating status, the results of an event generated and so on.

The container tag (the wireless terminal device) 100 is a RF communication module of a type including the function of eSeal for security as well as the function of a general active type RFID, and serves to collect container management information of a container and reports the container management information to the reader.

Figure 2:
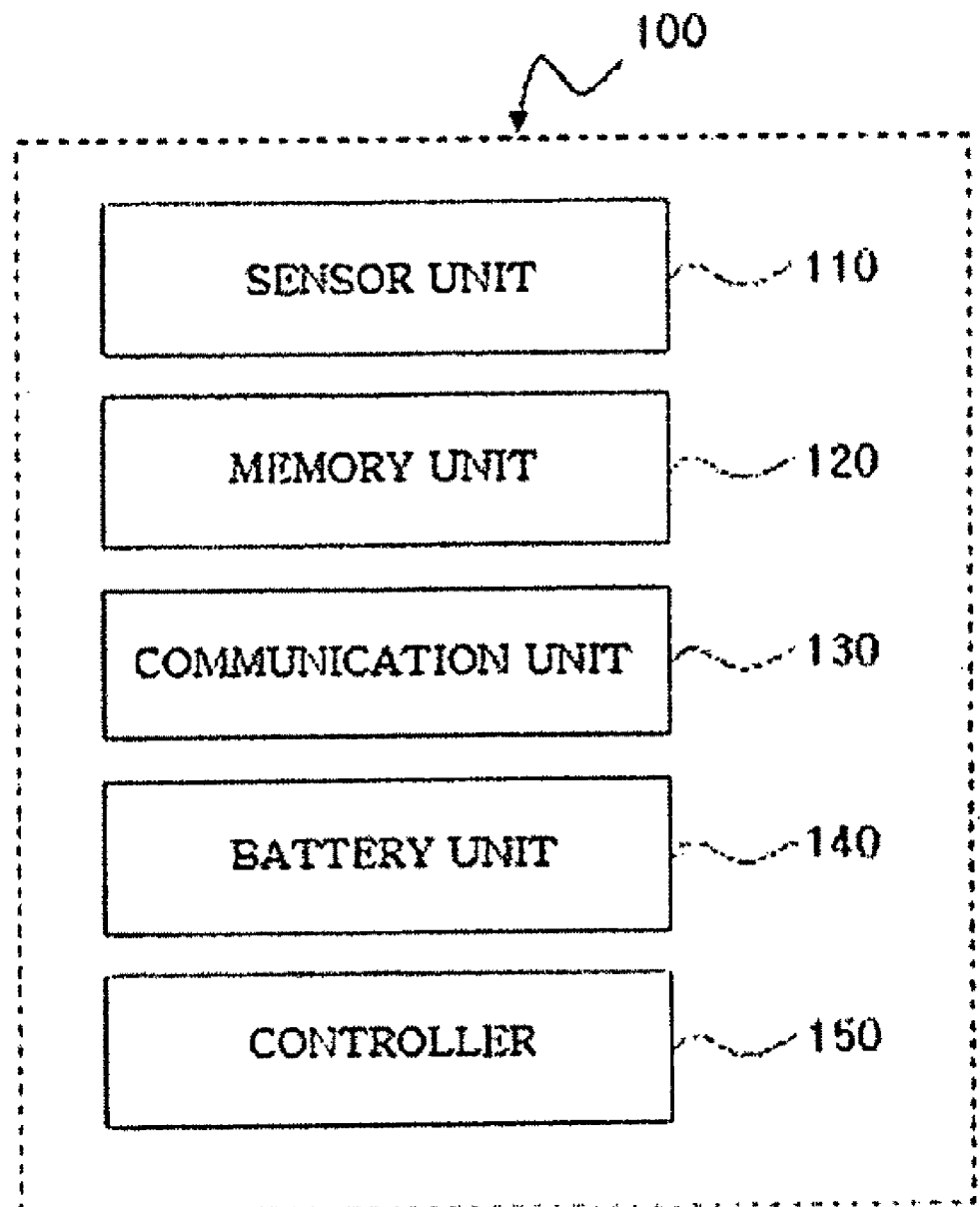
FIG. 2 is a block diagram of a container tag.

FIG. 2 is a block diagram of the container tag (the wireless terminal device).

As shown in FIG. 2, the container tag (the wireless terminal device) 100 includes a sensor unit 110, which measures a temperature, humidity, pressure and so on within a container and monitors security and crime prevention states, a memory unit 120 that temporarily stores collected information contents until transmission, a communication unit 130 that transmits stored information along with a container-specific address through RF, a battery unit 140 that supplies power to operate all constituent elements, and a controller 150 that controls the operation of each component.

The sensor unit 110 monitors internal environment measurement information, such as a temperature, humidity and pressure within a container, a battery status, opening and closing of a door of a container, a security crime prevention status such as eSeal, a communication status and so on.

Information collected by the sensor unit 110 is stored in the memory unit 120 and then transmitted to the reader (reader) 200 through the communication unit 130 along with a container-specific address through RF communication.

The container management information, sent to the communication unit 130, can be sent to the reader 200 immediately or at predetermined time intervals, if appropriate. A container-specific address and common internal measurement information, such as a temperature, humidity and pressure, are stored in the memory unit 120 and then transmitted at predetermined time intervals. Meanwhile, when an abnormal security state such as a functional operation of eSeal, abnormality in a temperature, humidity and pressure within a container, and an event such as possible discharge of a battery occur, this information is sent to the reader 200 immediately.

At this time, if this information is not properly sent since a communication state is not smooth, information that fails to be sent is stored in the memory unit 120 and then resent in the first place when the communication resumes. Further, if some time is taken until the communication restarts, container management information is accumulated and stored until normal transmission is performed. Thus, containers can be managed in real-time since event information is sent immediately as described above.

Wireless communication for information transmission can be constructed so that information can be transmitted to a distance of 3 km or more with UHF 433 MHz and output 10 mW or less.

The battery unit 140 that supplies power to the container tag (the wireless terminal device) 100 can include a battery for supplying power of about 3.7V and can be used for 3 to 4 years. The battery unit 140 performs a discharge monitoring function in conjunction with the sensor unit 110.

All the operations, such as information collection, transmission and monitoring of the above constituent elements, are under the control of the controller 150. Thus, the management system according to the present invention can perform the position tracking and monitoring functions of each container.

The reader (the reader) 200 that sends container management information, received from the container tag (the wireless terminal device) 100 constructed above through RF, to the management server can be installed at a vehicle, ship or the like for transporting containers. Thus, the reader 200 can be classified into a vehicle reader 210 and a ship reader 220 depending on its installation place. The reader 200 can further include a train reader installed at a freight train, and so on if appropriate.

Figure 3:
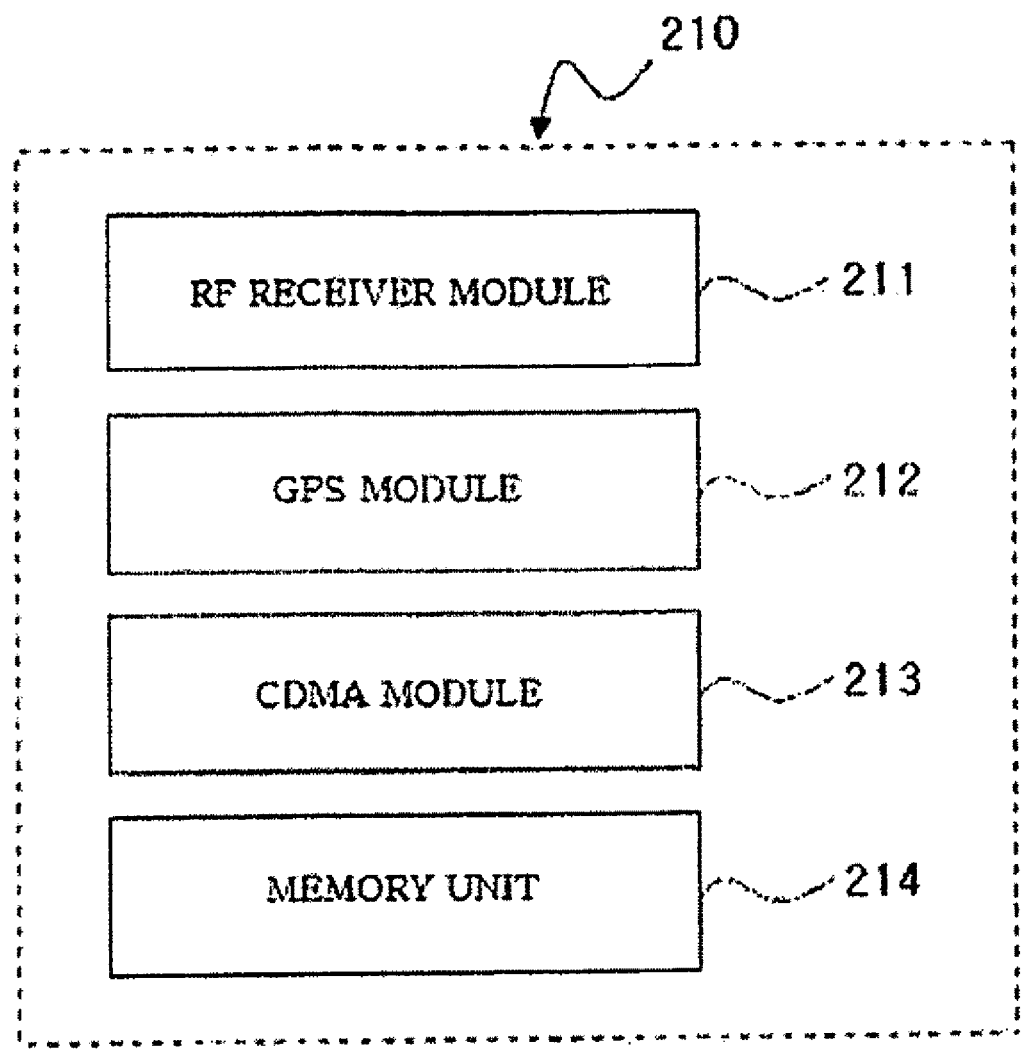
FIG. 3 is a block diagram of a vehicle reader.

FIG. 3 is a block diagram of the vehicle reader.

As shown in FIG. 3, the vehicle reader 210 mounted in a vehicle and configured to receive and relay container management information includes a RF receiver module 211 that receives container management information from the container tag (the wireless terminal device) 100, a GPS module 212 for analyzing position information of a vehicle having a container mounted therein, a CDMA module 213 that performs long-distance RF communication for transmitting the container management information and position information to the management server, and a memory unit 214 that collects and stores received the container management information.

The RF receiver module 211 receives information of the container tag (the wireless terminal device) 100 by using the function of the RF reader and can receive the container management information mounted in a vehicle with UHF 433 MHz and output 10 mW or less. Further, the GPS module 212 and the CDMA module 213 include general functions used for position tracking and CDMA communication.

Figure 4:
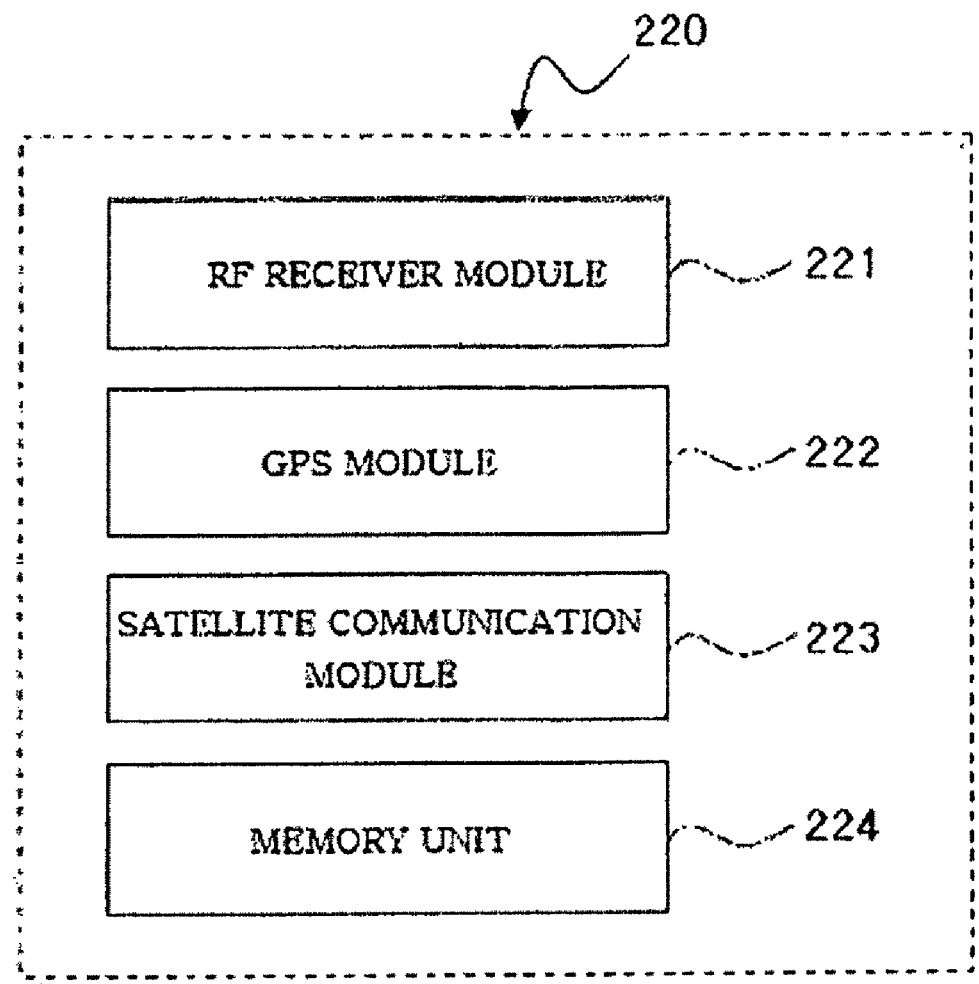
FIG. 4 is a block diagram of a ship reader.

FIG. 4 is a block diagram of the ship reader.

As shown in FIG. 4, the ship reader 220 that receives and relays the container management information mounted in a ship includes a RF receiver module 221 that receives container management information from the container tag (the wireless terminal device) 100, a GPS module 222 for analyzing position information of a ship having a container mounted therein, a satellite communication module 223 that performs long-distance RF communication for transmitting the container management information and position information to the management server, and a memory unit 224 that stores received container management information.

The ship reader 220 performs the same function as that of the vehicle reader 210, but includes the satellite communication module 223 for performing RF communication through satellites not CDMA because it has to send information to a farther distance.

The RF receiver module 221 performs the function of the RF reader that receives information of the container tag (the wireless terminal device) 100, and receives information of a container mounted in a ship and preferably having UHF 433 MHz and output 10 mW or less. Further, the GPS module 222 and the satellite communication module 223 include general functions for position tracking and satellite communication.

The reader 200 constructed above transmits information of each container, which is received through RF, to the management server 300.

The management server 300 includes a local server 310 installed at harbors, terminals, Inland Container Depots (ICD) and so on in which containers are placed, and a main server 320 that integrally manages information of the reader 200 and the local server 310. The local server 310 and the main server 320 are connected through the Internet and, therefore, container management information stored in one management server 300 can be retrieved anytime at other management servers 300 as well as the main server 320. As described above, sharable container management information is distributed and stored. Even though overload occurs due to concentration of data or error occurs in some of stored data, an overall system can operate normally.

The present embodiment proposes a system in which container management information of the vehicle reader 210 is sent to the local server 310 and container management information of the ship reader 220 is sent to the main server 320.

This can prevent communication delay and failure that may happen due to overload of information.

However, both the local server 310 and the main server 320 can be constructed to receive container management information of the vehicle reader 210 and the ship reader 220, if appropriate. Further, in the present embodiment, container management information of the container tag 100 of a container at a harbor terminal is directly sent to the local server 310 installed at a corresponding harbor. Thus, the local server 310 can be constructed to have the function of the reader 200.

Figure 5:
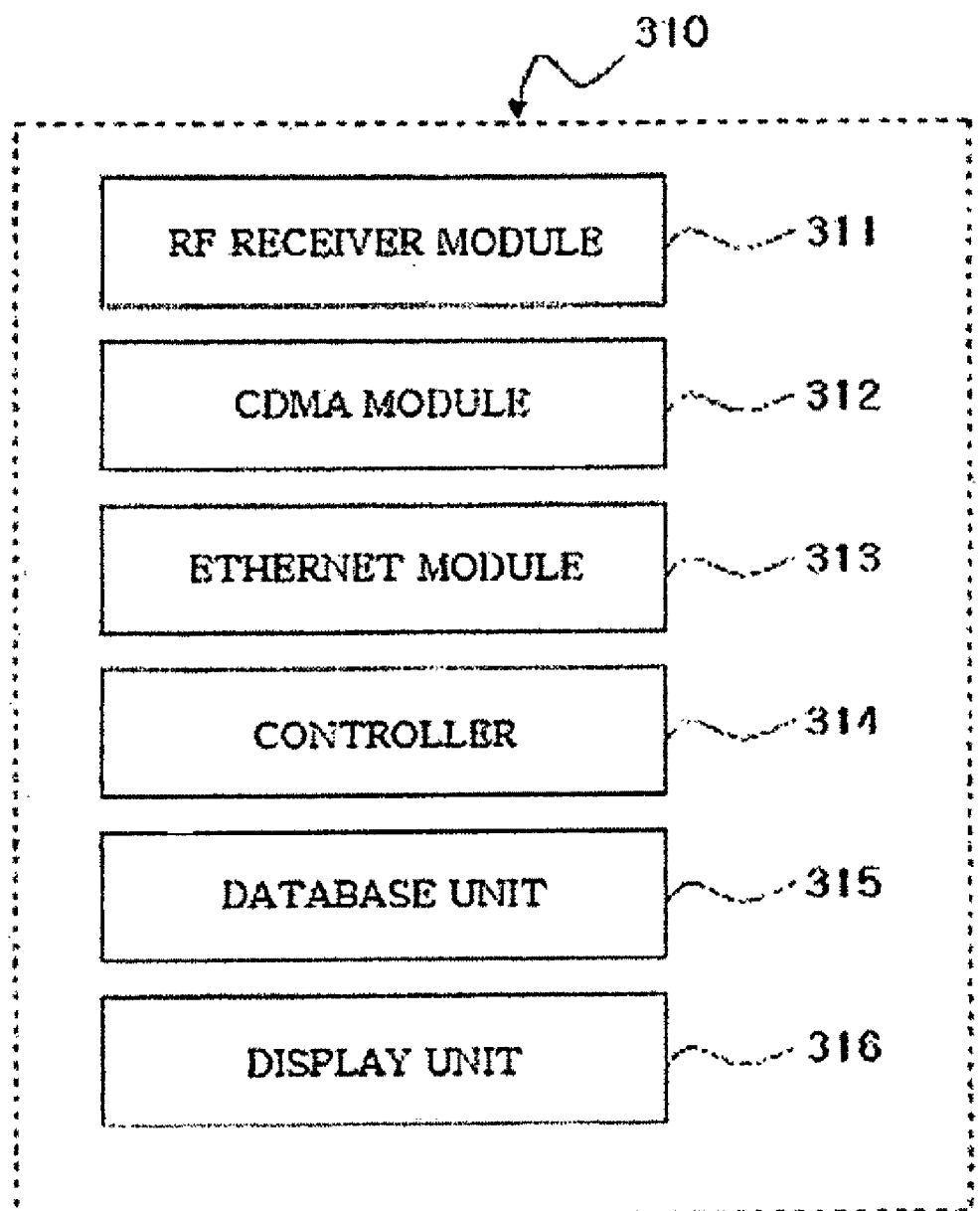
FIG. 5 is a block diagram of a local server.

FIG. 5 is a block diagram of the local server.

The local server 310 is installed at an ICD, etc. in which a container are placed. The local server 310 receives container management information from the container tag (the wireless terminal device) 100 of a container, receives container management information from the vehicle reader 210 installed at a vehicle in which containers are mounted and that moves, stores the collected container management information, outputs stored information, an operating status, the results of an event occurred and so on, and shares corresponding information with the main server 320 and other local servers along with a local server-specific address.

To this end, the local server 310, as shown in FIG. 5, includes a RF receiver module 311 that receives container management information from the container tag 100, a CDMA module 312 that receives the container management information from the vehicle reader 210, an Ethernet module 313 for connecting the local server 310 to the main server 320 or other local servers 310 through the Internet, a controller 314, which monitors and records an operating status of each reader 200 and generates an event when communication fails for a predetermined time, a database unit 315 that stores the collected container management information and the monitoring results of the controller, and a display unit 316 that outputs the stored container management information, an operating status, the results of an event occurred and so on through voice or a screen.

The local server 310 is assigned with each unique local server address, which is stored in the database unit 315 along with container management information received from the reader 200.

The transmitted container management information of each container is classified into normal state information reported at predetermined time intervals and abnormal state information immediately reported in the first place.

The normal state information includes collected information, such as a container-specific address, a temperature, humidity and pressure, which are reported from the container tag (the wireless terminal device) 100 to the reader 200 at stated intervals. The normal state information is output through the display unit 316 at stated intervals while being accumulated and stored in the database unit 315 of a corresponding local server 310 along with a local server-specific address. The display unit 316 can also include an alarm generator, etc. for calling attention of an administrator as well as a display device such as a monitor.

The abnormal state information includes an erroneous operation of eSeal, the occurrence of abnormality of environments within a container, such as a temperature, humidity and pressure, possible discharge of a battery, event information such as communication failure for a predetermined time and the like, which are instantly reported from the container tag (the wireless terminal device) 100 to the reader 200 in the first place. If this abnormal state information occurs, it is instantly sent to the local server 310 through RF communication. The abnormal state information is output through the display unit 316 while being stored in the database unit 315. The display unit 316 includes the alarm generator, etc. for calling attention of an administrator as well as the display device such as a monitor, and can thus manage containers in real-time since it can immediately recognize an event occurred.

For example, if a fire occurs in a container, a temperature abruptly rises abnormally. Thus, event information is instantly reported from the container tag (the wireless terminal device) 100. At the same time, the location of the container in which abnormality has occurred and a container-specific address are sent to the local server 310 through RF communication. Thus, an administrator can take appropriate measures in real-time.

The operations of storing and displaying all the pieces of information are controlled by the controller 316.

Figure 6:
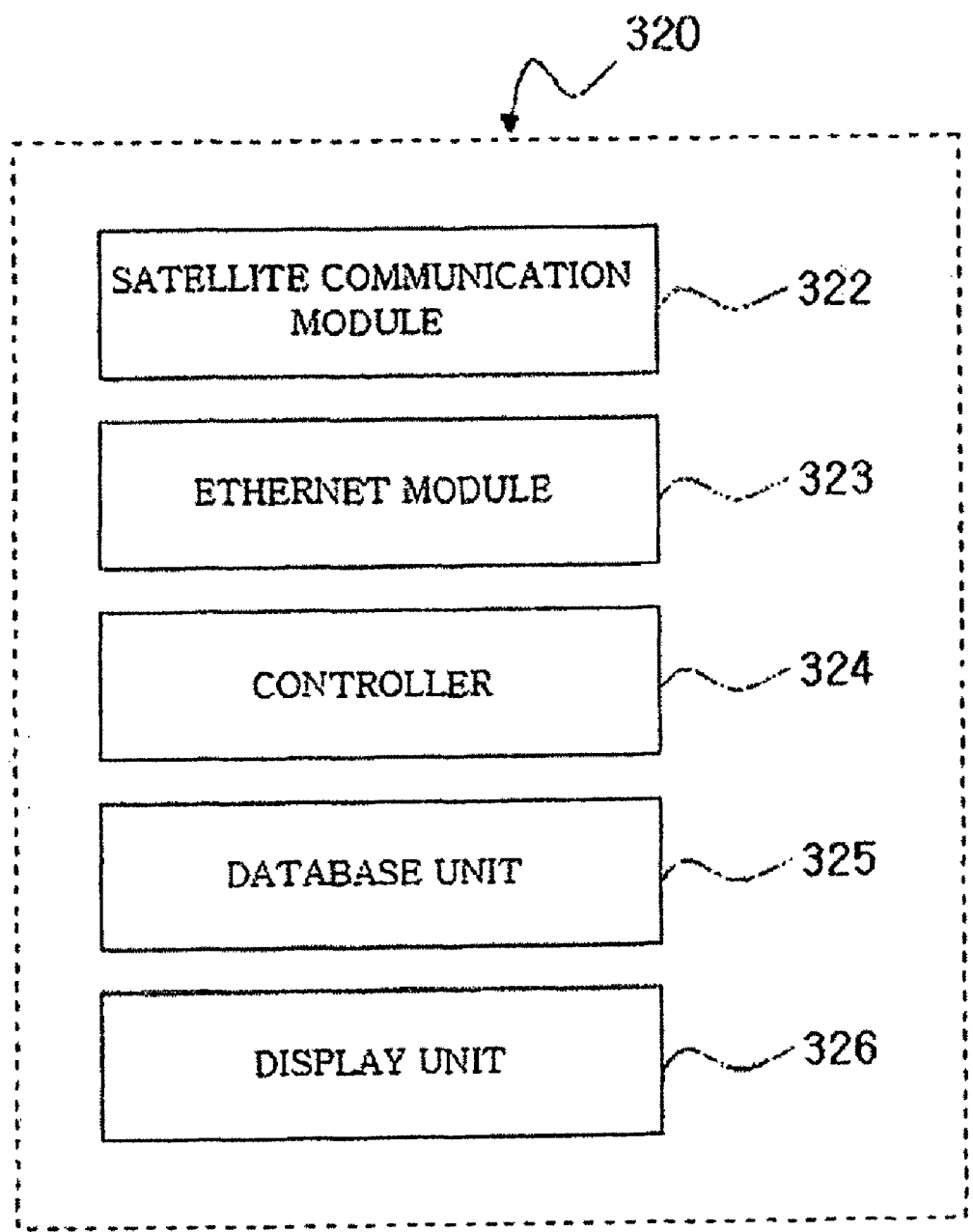
FIG. 6 is a block diagram of a main server.

FIG. 6 is a block diagram of the main server

The main server 320 entirely manages an overall system including the local server 310 installed at each harbor, the reader 200, and the container tag (the wireless terminal device) 100. The main server 320 receives pertinent information from the local server 310 connected through the Internet or shares pertinent information with the local server 310, receives container management information from the ship reader 220 installed at a ship that transports a container, stores the collected container management information, outputs stored information, an operating status, the results of an event occurred and so on, and shares corresponding information, as well as each local server-specific address and each container-specific address, with the local server 310.

To this end, the main server 320, as shown in FIG. 6, includes a satellite communication module 322 that receives the container management information from the ship reader 220, an Ethernet module 323 for connecting the main server 320 to the local server 310 through the Internet, a controller 324 for monitoring and recording an operating status of each reader 200 and generating an event when communication fails for a predetermined time, a database unit 325 that stores the collected container management information and the monitoring results of the controller, and a display unit 326 that outputs the stored container management information, an operating status, the results of an event occurred and the like through voice or a screen.

The main server 320 has the same function as that of the local server 310 except for that it controls the operation of an overall system including the local server 310. A plurality of the main servers 320 can be constructed in order to reduce overload that may happen due to concentration of information, if appropriate, so that information can be shared between the main servers 320 connected through the Internet. Thus, if a plurality of the main servers 320 are used, they are assigned with respective unique main server addresses, which are stored in the database unit 325 along with container management information sent from the reader 200.

The transmitted container management information of each container is classified into normal state information reported at predetermined time intervals and abnormal state information instantly reported in the first place.

The normal state information includes collected information, such as a container-specific address, a temperature, humidity and pressure, which are reported from the container tag 100 to the reader 200 at predetermined time intervals. The normal state information is output through the display unit 326 at stated intervals while being accumulated and stored in the database unit 325 of a corresponding main server 320 along with a main server-specific address. The display unit 326 can also include an alarm generator and so on for calling attention of an administrator as well as a display device such as a monitor.

The abnormal state information includes an erroneous operation of eSeal, the occurrence of abnormality of environments within a container, such as a temperature, humidity and pressure, possible discharge of a battery, event information such as communication failure for a predetermined time and the like, which are instantly reported from the container tag (the wireless terminal device) 100 to the reader 200 in the first place. If this abnormal state information occurs, it is instantly sent to the main server 320 through RF communication. The abnormal state information is output through the display unit 326 while being stored in the database unit 325. The display unit 326 includes the alarm generator, etc. for calling attention of an administrator as well as the display device such as a monitor, and can thus manage containers in real-time since it can immediately recognize an event occurred.

For example, if abnormality occurs in eSeal of a container, event information is instantly reported from the container tag 100. At the same time, the location of the container where abnormality has occurred and a container-specific address are transmitted to the main server 320 through RF communication, so that an administrator can take appropriate measures in real-time. Further, the administrator of the main server 320 can retrieve and control each situation that may happen in each local server 310.

The operations of storing and displaying all the pieces of information are controlled by the controller 326.

In the container position tracking and real-time management system constructed above according to the present invention, the position of a container that is being transported can be tracked by the GPS modules 212 and 222 included in the reader 200 installed at a vehicle or ship, and the position of the container at a harbor can be tracked through local server-specific addresses of the local server 310 installed at a corresponding harbor. Further, a container that is being transported can be managed in real-time by transmitting/receiving information through a wired/RF communication network to connect the container tag 100, the reader 200 and the management server 300.

Further, the container tag (the wireless terminal device) 100 is a kind of a USN monitoring system, which can perform not only the functions of the conventional RFID for physical distribution management and the conventional eSeal for security crime prevention, but also a function of monitoring temperature and humidity in real-time, and can be managed anywhere and anytime. Accordingly, physical distribution can be transported to its destination more safely.

INDUSTRIAL APPLICABILITY

In accordance with the present invention, a container tag having an information collection function of internal environments is attached to a container for logistics and transportation, and a reader equipped with a GPS module is installed at a vehicle or ship for transporting the container or a harbor in which the container is placed. Accordingly, there is an advantage in that the position of container physical distribution can be tracked until it reaches its destination.

Further, according to the present invention, when abnormality occurs in each container tag, this fact is instantly sent to a reader or a management server, an alarm is generated through voice or a screen, and necessary measures are taken immediately. Accordingly, there is an advantage in that physical distribution can be managed in real-time.

Further, the container tag of the present invention can perform not only the functions of the conventional RFID, but also functions such as crime prevention and security. Accordingly, there is an advantage in that the inside of a container can be prevented from being opened through external manipulation or illegal articles can be prevented from being loaded in the container.

Further, the container tag of the present invention can determine whether a temperature or humidity within a container exceeds a specific level or an abrupt change of a temperature or humidity within a container. Accordingly, there are advantages in that freight mounted in a container can be protected and the spread of an accident upon occurrence of a fire, etc. can be prevented.

Further, according to the present invention, container management information is distributed and stored but can be shared between management servers. Accordingly, there are advantages in that overload depending on concentration of information can be prevented and a danger of information loss can be reduced.

What is claimed is:

1. A container position tracking and real-time management system for tracking the location of a container in association with a wired/RF communication network, the system comprising:

a container tag including a sensor unit that monitors measurement information about environment within the container and whether the container is abnormal, and a communication unit that transmits container management information, including the monitoring results of the sensor unit and a container-specific address, to a reader through RF communication;

the reader being installed at a vehicle or ship that transports the container and including a RF receiver module that receives the container management information from the container tag, wherein the communication unit sends the collected container management information at predetermined time intervals, and immediately sends results of events including an error of eSeal, an occurrence of abnormality including a temperature, humidity and pressure, and a possible danger of discharge of a battery, and wherein when communication transmission fails, the communication unit accumulates and stores contents that have not been sent in a memory unit and then sends the contents in a first place when communication resumes.

2. The system of claim 1, wherein the reader is equipped with a GPS module for analyzing position information of the vehicle or ship with which the container is loaded.

3. The system of claim 1, wherein the reader is equipped with one of a CDMA module and a satellite communication module, and sends the received container management information to a management server through RF communication.

4. The system of claim 3, wherein the management server includes one of the CDMA module and a module for wired telephone, for receiving the container management information from the reader, and wherein the management server includes: a plurality of local servers disposed at a harbor in which containers are placed; and a main server that integrally manages information of each reader and each local server.

5. The system of claim 4, wherein the local server is equipped with a RF receiver module that receives container management information from the container tag of the container that is being loaded.

6. The system of claim 3, wherein the management server comprises: a controller for monitoring and recording an operating status of the reader and generating an event when a communication fails for a predetermined time; a database unit for storing each collected container management information and the monitoring results of the controller; and a display unit for outputting stored container management information, an operating status and results of an event through voice or a screen.

7. The system of claim 6, wherein the container management information stored in the database unit includes normal state information reported predetermined time intervals from the reader, and abnormal state information reported in the first place, wherein the abnormal state information is sent to the management server as soon as the abnormal state information is generated and then output through the display unit, and wherein the respective management servers are connected through the Internet and share stored normal state information and abnormal state information.

* * * * *